United States Patent
Dominguez et al.

(10) Patent No.: US 7,635,503 B2
(45) Date of Patent: Dec. 22, 2009

(54) COMPOSITE METAL FILMS AND CARBON NANOTUBE FABRICATION

(75) Inventors: Juan E. Dominguez, Hillsboro, OR (US); Valery M. Dubin, Portland, OR (US); Florian Gstrein, Portland, OR (US); Michael Goldstein, Sunnyale, CA (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 11/359,165

(22) Filed: Feb. 21, 2006

(65) Prior Publication Data

US 2007/0196575 A1    Aug. 23, 2007

(51) Int. Cl.
  *C23C 16/00*  (2006.01)
(52) U.S. Cl. .................................. 427/249.1; 977/742
(58) Field of Classification Search ............. 427/248.1, 427/249.1; 977/742
See application file for complete search history.

(56) References Cited

FOREIGN PATENT DOCUMENTS

JP          11139815 A  *  5/1999

OTHER PUBLICATIONS

Hsu, Chih Ming et al.,"Growth of the large area horizontally-aligned carbon nanotubes by ECR-CVD",Thin Solid Films 420-421 (2002), pp. 225-229.
Kitiyanan, B. et al., "Controlled production of single-wall carbon nanotubes by catalytic decomposition of CO on bimetallic Co-Mo catalysts",Chemical Physics Letters 317(2000), Dated Feb. 4, 2000, pp. 497-503.
Zhang, Y. et al., "Imaging as-grown single-walled carbon nanotubes originated from isolated catalytic nanoparticles", Appl. Phys. A 74 325-328 (2002) / Digital Object Identifier (DOI) 10.1007/ s003390201274, Dated Mar. 4, 2002, pp. 325-328.
Zheng, L. X. et al., "Ultralong single-wall carbon nanotubes", Nature Materials, vol. 3, Dated Oct. 2004, pp. 673-676.
Puurunen, Riikka L., "Growth Per Cycle in Atomic Layer Deposition: A Theoretical Model", Chem. Vap. Deposition 2003, 9, No. 5, pp. 249-257.

* cited by examiner

*Primary Examiner*—Roberts Culbert
(74) *Attorney, Agent, or Firm*—Julia A. Hodge

(57) ABSTRACT

Embodiments of the present invention provide methods for the fabrication of carbon nanotubes using composite metal films. A composite metal film is fabricated to provide uniform catalytic sites to facilitate the uniform growth of carbon nanotubes. Further embodiments provide embedded nanoparticles for carbon nanotube fabrication. Embodiments of the invention are capable of maintaining the integrity of the catalytic sites at temperatures used in carbon nanotube fabrication processes, 600 to 1100° C.

15 Claims, 3 Drawing Sheets

COMPOSITE METAL FILMS AND CARBON NANOTUBE FABRICATION

BACKGROUND OF THE INVENTION

1. Field of the Invention

Embodiments of the present invention relate generally to semiconductor materials, devices, and processes, and composite metal films and carbon nanotubes.

2. Background Information

Carbon nanotubes (CNTs) are promising materials for extending semiconductor device miniaturization due to their electron (ballistic transport) and heat transport properties. Carbon nanotubes having a higher thermal conductivity than diamond can be fabricated. In general, carbon nanotubes are fullerene-related structures consisting of cylindrical nanomeric structures of carbon atoms arranged in a hexagonal lattice. Carbon nanotubes can be single-walled or multi-walled (concentric). Carbon nanotubes can be formed, for example, at graphite electrodes during the arc-evaporation of carbon. Single-walled carbon nanotubes can be formed at graphite electrodes containing metals such as cobalt.

Carbon nanotubes having metallic or semiconducting properties can be fabricated. A number of applications for carbon nanotubes have been proposed and demonstrated. Carbon nanotubes can be used, for example, as nanowires in a nano-electronic device or as active components of nano-mechanical devices, such as field-effect transistors, electro-mechanical actuators, and field emitters in CNT field-emission displays.

DETAILED DESCRIPTION OF THE INVENTION

Embodiments of the present invention provide methods for fabricating carbon nanotubes at catalytic sites. In the embodiments of the present invention, catalytic sites for CNT growth can be fabricated that are small, uniform, and regularly spaced. As compared to typical supported metal catalysts used for carbon nanotube growth, these catalytic sites are relatively resistant to catalyst metal surface diffusion and the resulting metal particle agglomeration and growth, at the operating temperatures used for carbon nanotube growth. Because uniform catalytic sites can be created and maintained throughout synthesis, increased control of the distribution and diameter of the carbon nanotubes created by chemical vapor deposition (CVD) can be achieved.

A common method of carbon nanotube growth begins with the deposition of metal catalyst particles onto a solid surface. The particles are then heated to temperatures between 300 and 1200° C. and carbon containing gases are introduced. The growth of carbon nanotubes, due to its energetic nature, requires temperatures close to the melting points of a significant fraction of many CNT catalysts (such as for example, Mo and Co). At high temperatures, therefore, a significant amount of metal surface diffusion occurs; the metal surface diffusion can then cause metal particle agglomeration and growth. The problem of metal particle agglomeration is commonly avoided by patterning areas for metal catalyst positioning. However current patterning methods cannot be used to create metal particles having dimensions needed for single walled nanotube growth, about 5 to 10 Angstroms.

In one embodiment of the invention saturated metal films are used to provide catalytic sites for carbon nanotube growth in an inactive matrix. Catalytic sites are formed through phase separation in saturated metallic alloys, doped intermetallics, and or metal doped oxides. Phase separation has been studied and characterized. See, for example, Porter, D. A., Easterling, K. E., "Phase Transformations in Metals and Alloys," Nelson and Thornes, Eds., U. K. (2001) and "Binary Alloy Phase Diagrams, 2nd ed.," editor-in-chief, Thaddeus B. Massalski ; editors, Hiroaki Okamoto, P. R. Subramanian, Linda Kacprzak. Materials Park, Ohio, ASM International (1990).

Figure 1:
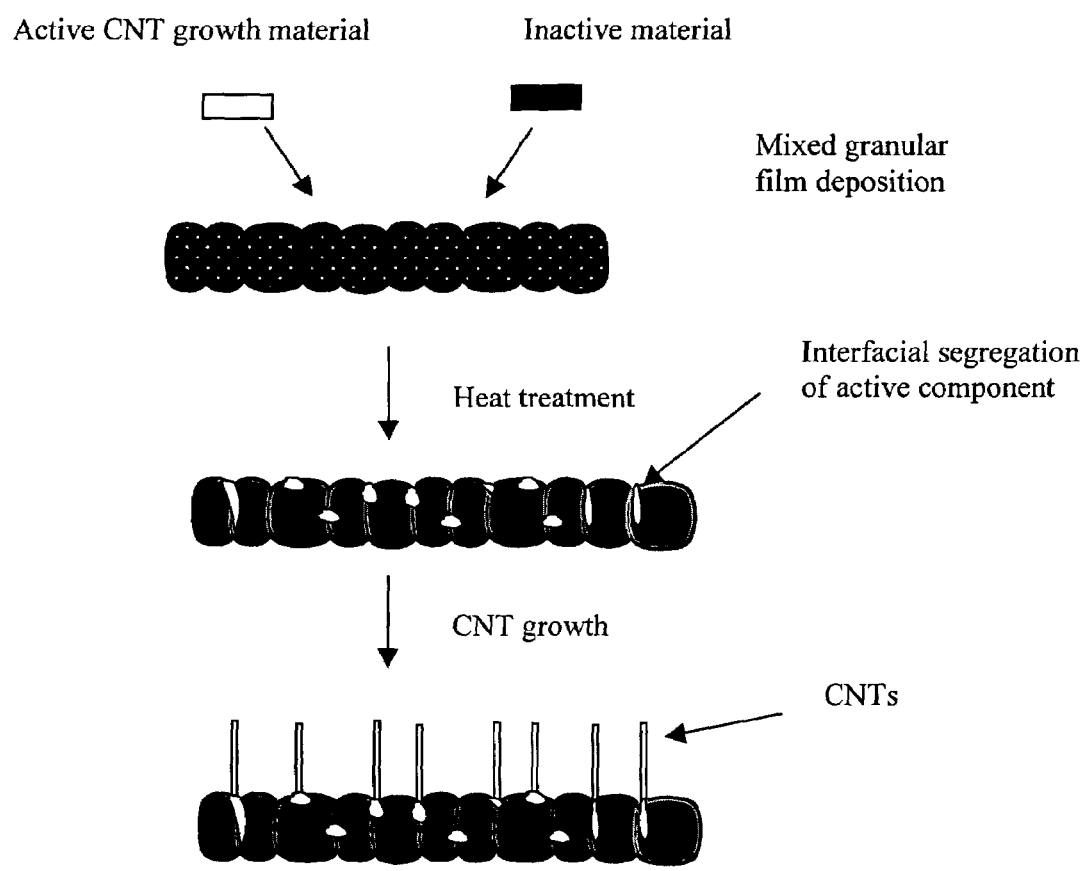
FIG. 1 diagrams a method for carbon nanotube growth using phase separated films to provide catalytic islands in an inactive matrix.

Referring now to FIG. 1, a film comprised of grains that contain an active carbon nanotube growth material as the less abundant component (or dopant) and an inactive material are depicted. In general, an active carbon nanotube growth material is a material that can catalyze the formation of carbon nanotubes, such as for example, Co, W, Ni, Fe, Pd, and Pt. See also, Dresselhaus, M., Dresselhaus, G., and Eklund, P. C., "Science of Fullerenes and Carbon Nanotubes," Academic Press, San Diego, Calif. (1996). Similarly, an inactive material generally is a material that does not catalyze the growth of carbon nanotubes under conditions used to form carbon nanotubes, such as for example, some oxides from metal catalysts (with the exception of $Fe_2O_3$), $SiO_2$, SiN, polymeric films, materials used to form dielectric layers, and metals such as, for example, Al, Cu, and Ti. See also, Dai, H. et al., *Appl. Phys.*, A74:325 (2002).

The fabrication of compact alloyed and or doped thin films can be accomplished by physical or chemical vapor deposition methods, as well as other methods, such as for example, pulsed laser deposition. Metal deposition to create an alloyed or doped thin film can be accomplished, for example, by sputtering, ALD (atomic layer deposition) plating, or electrolysis. Further, alloyed films may be deposited by CVD through the controlled addition of metal precursors at appropriate ratios and the use of purging procedures or the use of two chambers for deposition. Additionally, a saturated metal film may be created by CVD using a precursor containing two or more metals, such as for example, (CpRu($\eta^5$—$C_5H_3CH_2NMe_2$)Pt(hfac) (Cp is cyclopropane and hfac is hexafluoroacetylacetonate).

Alloyed or doped thin films can be deposited from alloyed sputtering targets having a desired active metal concentration or a combination of metal precursors. Deposition from single metal targets may be used to avoid preferential sputtering or evaporation, depending in the metals selected. The concentration selected of the catalyst in the alloy would be above the equilibrium solubility limit at the operating temperature for carbon nanotube formation, but below the alloy phase formation concentration. Equilibrium solubility and alloy phase formation concentration data are available, for example, in Porter, D. A., Easterling, K. E., "Phase Transformations in Metals and Alloys," Nelson and Thornes, Eds. U. K. (2001). For example, the phase diagram of Pd and Ti shows the formation of a secondary phase of $Ti_4Pd$ at 20 atomic percent (at %) Pd, with a solubility of about 12 at % Pd, indicating appropriate Pd concentrations of between 12 to 20 at % at 700° C.

Similarly, doped intermetallics and oxides can be deposited by, for example, CVD or PVD (physical vapor deposition) methods. For example, a doped oxide/intermetallic film comprised of Co as an active material and TiO$_2$ as an inactive material can be CVD deposited on a substrate surface using Co(acac)$_2$ (acac is acetylacetonate anion) and TiCl$_4$ at about 300° C. and using H$_2$ as a co-reactant. The metal and oxide can also be deposited by PVD from a pure metal followed by oxidation. For example, a PVD Ti film can be exposed to air at moderate temperatures to form TiO$_2$ and then a PVD Co nanolayer deposited on top. Metal solubility in oxides, such as for example, SiO$_2$, depends on charge and ionic radius and it is usually between about 1 to 10 at % at maximum.

The non-equilibrium conditions of most film growth techniques can result in higher than equilibrium solubility in alloys or doped oxides. A thermal (or sometimes a physical) treatment can result in the precipitation of the dopant component at grain boundaries and or the formation of secondary phases and surface segregation of dopants. Depending on the treatment method, film grain size, and the amount of dopant, precipitates or secondary phases on the order of about 1 to about 10 nm in size can be fabricated. See, for example, Ohring, M., "The Materials Science of Thin Films," Academic Press, Wiley Interscience, San Diego, Calif. (1992).

Referring again to FIG. 1, the multi-component film is heated to temperatures for carbon nanotube growth (between 600 and 1100° C.), creating a phase-separated film. Thermal cycling occurs in an inert atmosphere to avoid undesired reactions. After heating, the film is allowed to slowly cool to room temperature unassisted in order to avoid the formation of non-equilibrium phases. After cooling, the metal catalyst films can be microscopically analyzed to determine the location and size of active catalyst areas.

Generally, carbon nanotubes can be produced through the thermal decomposition of hydrocarbons by chemical vapor deposition (CVD), optionally in the presence of hydrogen gas. Hydrocarbon reagents include, for example, carbon monoxide (CO), methane (CH$_4$), and acetylene gas (C$_2$H$_2$) diluted with hydrogen gas as well as alcohols and ethers. Water vapor may also be used in place of or in addition to hydrocarbon reagents. Further gas phase reactions of catalyst-containing molecules and a reactive gas can be used, such as for example, mixtures of ferrocene and hydrogen. Carbon nanotubes are fabricated, for example, through heating (to temperatures between 300 and 1200° C.) and flowing a carbon containing vapor flow over a surface supporting the metal catalysts. See also, for example, Kitiyanan, B., Alvarez, W. E., Harwell, J. H., Resasco, D. E., *Chem. Phys. Lett.*, 317:497 (2000); Hsu, M. C., Lin, C. H., Chang, H. L., Kuo, C. T., *Thin Solid Films*, 420:225 (2002); Liao, X. Z., Serquis, A., Jia, Q. X., Peterson, D. E., Zhu, Y. T., *Appl. Phys. Lett.*, 82(16):2694 (2003); and Zheng, L. X., O'Connell, M. J., Doom, S. K., Liao, X. Z., Zhao, Y. H., Akhadov, E. A., Hoffbauer, M. A., Roop, B. J. Jia, Q. X., Dye, R. C., Peterson, D. E., Huang, S. M., Liu, J., Zhu, Y. T., *Nature Materials*, 3:673 (2004). Embodiments of the present invention are not limited to a particular method for growing carbon nanotubes at the catalytic sites. As is shown in FIG. 1, carbon nanotubes grow at the interfacially segregated active catalyst areas that are surface-available.

Figure 2:
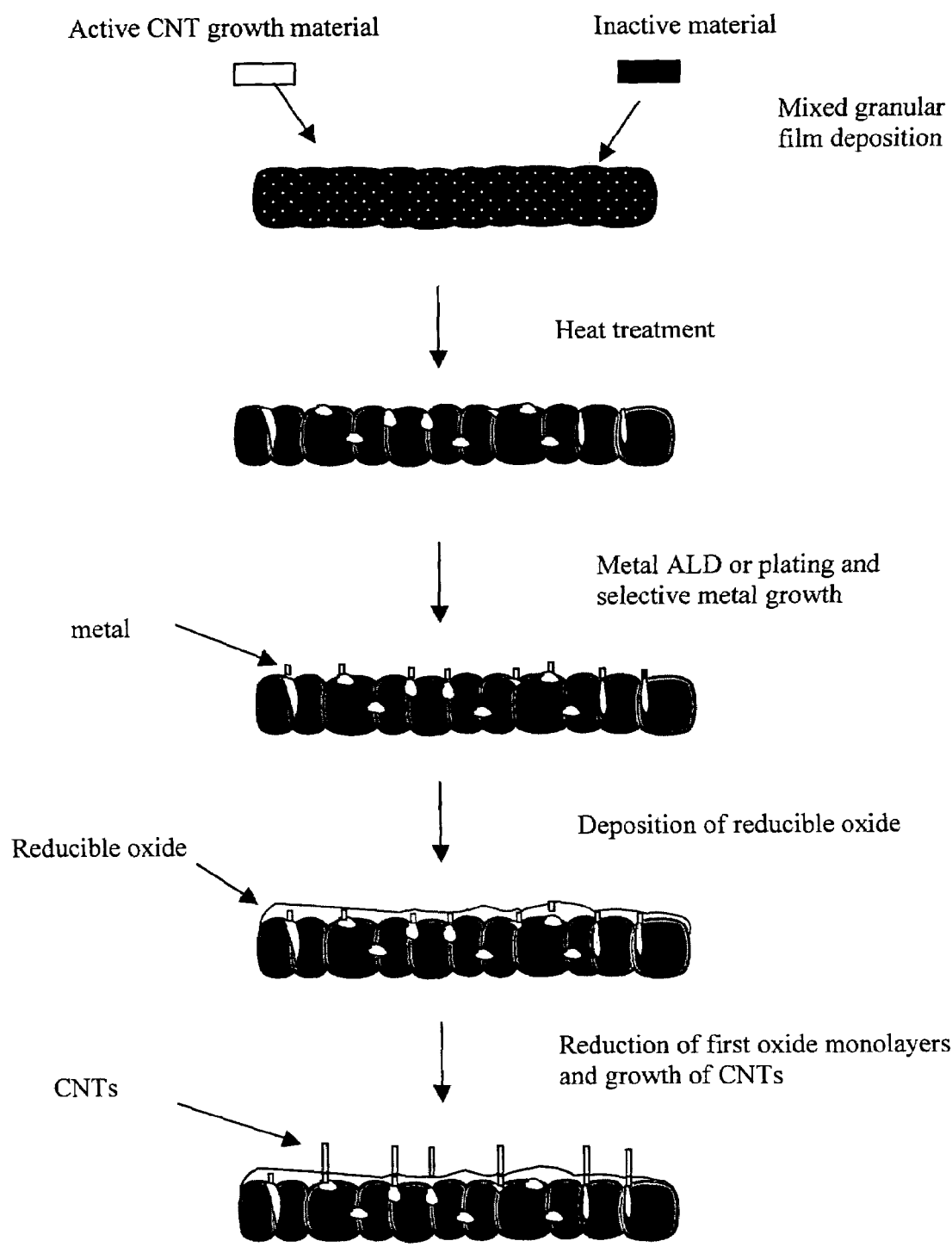
FIG. 2 diagrams a further method for carbon nanotube growth using phase separated films.

In another embodiment of the invention, saturated metal films and intermetallic and or oxide films, such as for example, mixtures of active metals (e.g., Co, Fe, Pt, Pd, and Ni) and reducible oxides (e.g., TiO$_2$, SnO$_2$, RuO$_2$, and WO$_3$) are used to create catalytic sites for carbon nanotube growth. A phase-separated film is used as a template for the further growth of nanoparticle catalytic sites. Referring now to FIG. 2, a film comprised of grains that contain an active material as the less abundant component (or dopant) and an inactive material are depicted. The formation of the initial film of FIG. 2 is similar to the initial film described in FIG. 1 and can be accomplished by physical or chemical vapor deposition methods, as well as other methods, such as for example, pulsed laser deposition, spin-on, and evaporation. Again, similar to FIG. 1, the multi-component film is heated to temperatures for carbon nanotube growth (between 300 and 1200° C.), creating a phase-separated film. Thermal cycling occurs in an inert atmosphere to avoid undesired reactions. The thermal treatment results in the precipitation of the dopant component at grain boundaries and or the formation of secondary phases and surface segregation of components. After heating, the film is allowed to slowly cool to room temperature unassisted in order to avoid the formation of non-equilibrium phases.

After phase segregation, atomic layer deposition (ALD) of a catalytic metal, such as, for example, Pd, Co, Ni, Fe, and Pt, takes place on an oxide having a segregated noble metal phase. It has been demonstrated that certain ALD precursors do not nucleate on oxide (SiO$_2$) surfaces, such as, for example, Pd(hfac)$_2$ and trimethyl aluminum. See, for example, Puurunen, R. L., *Chem. Vapor Dep.*, 9:249 (2003). Some metals do not chemisorb on oxides and some oxides do not chemisorb on metals making the selective growth of metal catalyst on a surface possible. The deposition of less than 1 ML of metal avoids the horizontal growth of metal nanoparticles. These resulting small active particles on the segregated film can be used for carbon nanotube growth. As depicted in FIG. 2, after metal ALD deposition, a continuous layer of highly reducible oxide, such as, for example, TiO$_2$, SnO$_2$, or RuO$_2$, is deposited. The reducible oxide layer is deposited at a thickness that is approximately the thickness of the catalyst particles in order to embed the catalytic particles in the oxide layer. A posterior reducing treatment uncovers the first atomic layers of the metal catalyst embedded in the secondary phase. Carbon nanotubes are grown at the uncovered metal catalyst as described herein.

In a further embodiment of the invention, after phase segregation of the catalytic and non-catalytic components in the alloyed or doped film, electroless plating of a catalytic metal such as, for example, Pd, Co, Fe, Ni or an alloy thereof, takes place on the segregated noble metal phase. The reducible oxide is deposited before CNT growth as described above. Carbon nanotubes are then grown at the resulting nanoparticle catalytic centers.

Figure 3:
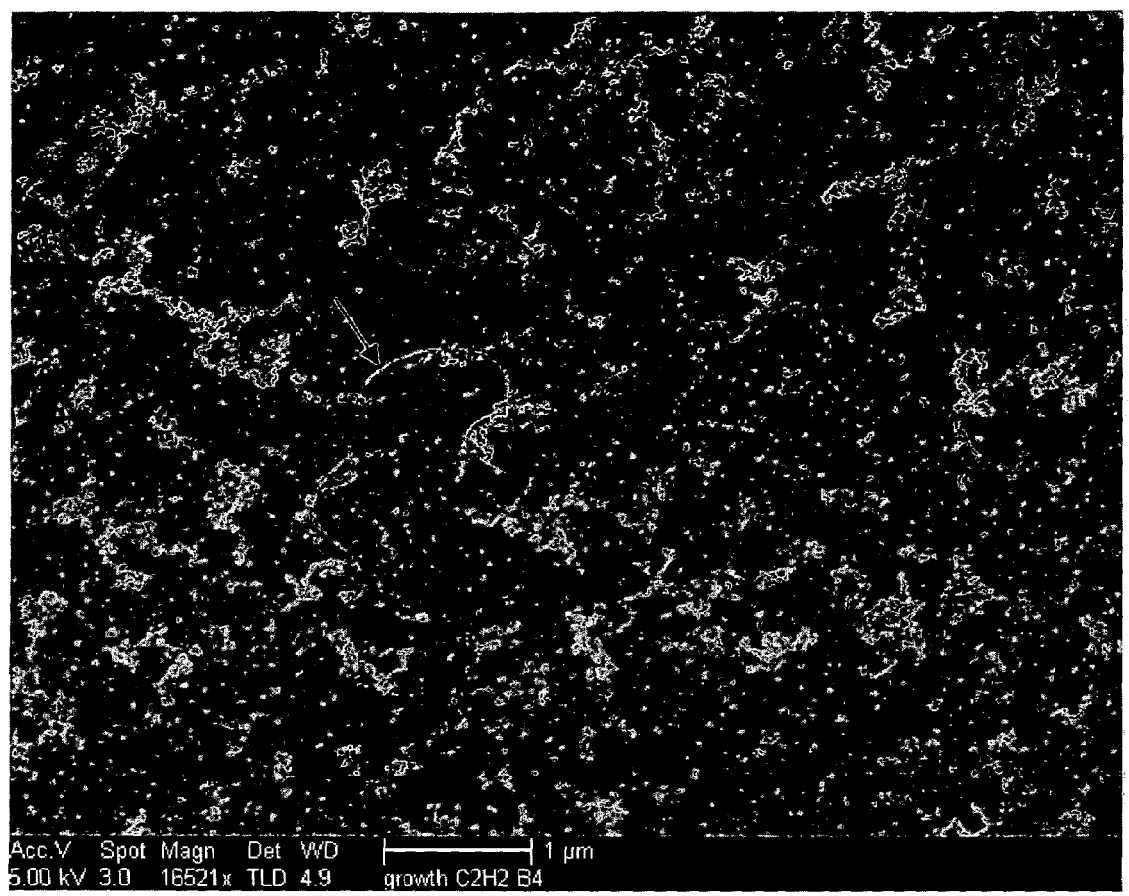
FIG. 3 shows a scanning electron microscope image of carbon nanotubes grown at 800° C. on a graded film fabricated using evaporated cobalt and iron metals. An arrow identifies a carbon nanotube.

Referring now to FIG. 3, a scanning electron micrograph of carbon nanotubes grown on catalytic sites comprised of Co 10 Å and 5 Å Fe as co-deposited catalyst particles. An arrow indicates a carbon nanotube that can be observed in the scanning electron micrograph. The nanotubes were grown for 15 minutes at 800° C. using 1000 sccm C$_2$H$_2$ at 1 atmosphere pressure. The Co and Fe particles were co-evaporated on a SiO$_2$ substrate to form individual Co and Fe islands. After annealing, it is believed that the Co and Fe islands most likely agglomerated and formed an alloy material at the catalytic sites for nanotube growth.

We claim:

1. A method for fabricating carbon nanotubes comprising:
depositing a film comprising an active component and an inactive component wherein the active component is capable of catalyzing the formation of carbon nanotubes at a temperature of between about 300° C. to about 1200° C. in the presence of a carbon containing precursor and the inactive component is not capable of catalyzing the formation of carbon nanotubes at a temperature of between about 300° C. to about 1200° C. in the presence of a carbon containing precursor and wherein the amount of active component in the film is above the equilibrium solubility limit but below the alloy phase formation concentration for the active component in the inactive component at a temperature between about 300° C. to about 1200° C.;

heating the film to a temperature of between about 300° C. to about 1200° C. to cause the active component to form at least one phase-separated surface-available catalytic site; and forming carbon nanotubes by chemical vapor deposition with a carbon-containing precursor.

2. The method for fabricating carbon nanotubes of claim 1, wherein the at least one surface-separated active component has dimensions of less than about 10 Angstroms.

3. The method for fabricating carbon nanotubes of claim 1, wherein active component is a metal selected from the group consisting of Co, W, Ni, Fe, Pd, and Pt.

4. The method for fabricating carbon nanotubes of claim 1, wherein inactive component is selected from the group consisting of $SiO_2$, SiN, polymeric films, dielectric materials, Al, Cu, and Ti.

5. The method for fabricating carbon nanotubes of claim 1, wherein the film is deposited by sputtering, atomic layer deposition plating, or electrolysis, pulsed laser deposition, physical vapor deposition, spin-on, evaporation, or chemical vapor deposition.

6. The method for fabricating carbon nanotubes of claim 1, wherein the deposited film is a non-equilibrium film.

7. The method for fabricating carbon nanotubes of claim 1, also including the electroless plating of a catalytic metal onto the phase-segregated active component prior to the formation of carbon nanotubes.

8. A method for fabricating carbon nanotubes comprising:
depositing a film comprising an active component and an inactive component wherein the active component is capable of catalyzing the formation of carbon nanotubes at a temperature of between about 300° C. to about 1200° C. in the presence of a carbon containing precursor and the inactive component is not capable of catalyzing the formation of carbon nanotubes at a temperature of between about 300° C. to about 1200° C. in the presence of a carbon containing precursor and wherein the amount of active component in the film is above the equilibrium solubility limit but below the alloy phase formation concentration for the active component in the inactive component at a temperature between about 300° C. to about 1200° C.;

heating the film to a temperature of between about 300° C. to about 1200° C. to cause the active component to form at least one phase-separated surface-available nanoparticle;

depositing a catalytic metal by atomic layer deposition;

depositing a continuous layer of a highly reducible oxide;

reducing the continuous layer of the highly reducible oxide to expose at least the first atomic layer of the metal catalyst; and forming carbon nanotubes by chemical vapor deposition with a carbon-containing precursor.

9. The method for fabricating carbon nanotubes of claim 8, wherein active component is a metal selected from the group consisting of Co, W, Ni, Fe, Pd, and Pt.

10. The method for fabricating carbon nanotubes of claim 8, wherein the inactive component is an oxide selected from the group consisting of $SiO_2$, $TiO_2$, $SnO_2$, and $RuO_2$.

11. The method for fabricating carbon nanotubes of claim 8, wherein the deposited film is a non-equilibrium film.

12. The method for fabricating carbon nanotubes of claim 8, wherein the highly reducible oxide is $TiO_2$ or $SnO_2$.

13. The method for fabricating carbon nanotubes of claim 8, wherein the active component forms a plurality of surface-available nanoparticles.

14. The method for fabricating carbon nanotubes of claim 8, wherein the atomic layer deposition deposits less than 1 ML of metal.

15. The method for fabricating carbon nanotubes of claim 8, wherein the catalytic metal is selected from the group consisting Pd, Co, Ni, and Fe.

* * * * *